United States Patent [19]

Okamura et al.

[11] Patent Number: 4,696,827

[45] Date of Patent: Sep. 29, 1987

[54] SILICON CARBIDE-CARBON COMPOSITE MOLDED PRODUCT AND PROCESS FOR MANUFACTURING THE SAME

[75] Inventors: Kiyohito Okamura; Yoshio Hasegawa, both of Ibaraki; Yoshiyasu Kuroo, Koganei; Masana Ugaji, Tokyo, all of Japan

[73] Assignees: Sony Corporation; The Foundation: The Research Institute for Special Inorganic Materials, both of Tokyo, Japan

[21] Appl. No.: 805,268

[22] Filed: Dec. 6, 1985

Related U.S. Application Data

[63] Continuation of Ser. No. 557,183, filed as PCT JP83/00076 on Mar. 11, 1983, abandoned.

[30] Foreign Application Priority Data

Mar. 12, 1982 [JP] Japan .................................. 57-39771

[51] Int. Cl.$^4$ .......................... B05D 3/06; B05D 3/02
[52] U.S. Cl. ...................................... 427/36; 427/44; 427/54.1; 427/227; 427/228; 427/296; 427/341; 427/377; 427/379
[58] Field of Search ...................... 427/228, 227, 54.1, 427/36, 44, 341, 379, 377, 296

[56] References Cited

U.S. PATENT DOCUMENTS 3,416,944 12/1968 Pirrung et al. ...................... 427/228
3,628,985 12/1971 Hider et al. .......................... 427/228
3,901,752 8/1975 Taylor .................................. 427/228
3,917,884 11/1975 Jahn ..................................... 427/228
4,024,226 5/1977 Lersmacher et al. ............... 427/228
4,267,211 5/1981 Yajima et al. ....................... 427/228
4,395,460 7/1983 Gaul .................................... 427/228
4,404,153 9/1983 Gaul .................................... 427/228

Primary Examiner—Norman Morgenstern
Assistant Examiner—Janyce A. Bell
Attorney, Agent, or Firm—Hill, Van Santen, Steadman & Simpson

[57] ABSTRACT

A molded product consisting mainly of silicon carbide and a process for manufacturing the same. This invention is to provide a product having a desired or complicated shape and a process which enables the manufacture of any such product at a drastically lower temperature than any conventional process. This object is attained by applying an organic silicon polymer having a skeleton composed mainly of carbon-silicon bonds by impregnation or adherence to a base material having a desired shape, and by burning the base material at a temperature of 700° C. to 2,000° C. in a vacuum or in a nonoxidizing gas atmosphere. The product of this invention has a fibrous, granular and/or firmly carbon structure in the matrix consisting mainly of SiC. The product of this invention is useful for a wide variety of applications, for example, for making heat-resistant structural members of electronic devices.

16 Claims, No Drawings

SILICON CARBIDE-CARBON COMPOSITE MOLDED PRODUCT AND PROCESS FOR MANUFACTURING THE SAME

This is a continuation of application Ser. No. 557,183, filed Nov. 9, 1983, now abandoned.

TECHNICAL FIELD

This invention relates to a silicon carbide-carbon composite molded product containing a fibrous, granular and/or filmy carbon structure in the matrix consisting mainly of SiC, and to a process for manufacturing the same.

BACKGROUND ART

Manufacture of molded products of silicon carbide is generally based on subjecting pressure and heat to silicon carbide powder mixed with a sintering assistant in a graphite press tool. With zero-pressure sintering method, the thus pressed material is burned in a vacuum or non-oxidizing atmosphere. According to reaction sintering method, the formation of silicon carbide from its materials and the sintering of silicon carbide are carried out successively. There are also known self-sintering method, and silicon-injection sintering method and so on as conventional methods. Each of these methods has, however, the disadvantage that only products having a relatively simple shape, such as planar or columnar, can be obtained. In order to obtain molded products having a more complicated shape, there have been proposed improved methods, such as powder vehicle or pseudoisostatic hot press method, multi-punch hot press method and hot isostatic press method, each of which consists essentially of compacting the molded material filled in a powder vehicle. These methods, however, provide products still limited in shape and dimensions, and require complicated facilities of high performance and a high manufacturing cost.

As one of the methods of molding the material to be sintered, sheet dipping method, which is a method for molding mainly thin plates, is known. This method comprises dipping paper with a coagulant adsorbed on the surface thereof in a slurry in which ceramic powder is peptized, and fixing the powder on the paper surface by ion exchange. Japanese Patent Application No. 46-7604 discloses a method of making paper from a mixed slurry composed of cellulose pulp and a ceramic powder which is used as a filler. These methods, however, have problems of low ceramic powder content, limited range of moldability and low yield owing to cracking or deformation on burning. Moreover, when silicon carbide is used as a material for the molded product, a high burning temperature not lower than 1,700° C. is generally required since silicon carbide is difficult to sinter.

DISCLOSURE OF THE INVENTION

It is an object of this invention to provide a molded product consisting mainly of silicon carbide and having a fine and complicated shape that has not been realized by any conventional method, and to manufacture such a molded product at a lower temperature.

The inventors of this invention have made an extensive research, noting that an organic silicon polymer having a skeleton consisting mainly of carbon-silicon bonds forms β-SiC when it is burned at a temperature of about 800° C. or higher in a non-oxidizing atmosphere, and utilizing that this polymer is soluble in an ordinary organic solvent and can melt by heat. As a result, it was found that the object of this invention can be attained by dipping in a solution or a molten bath of an organic silicon polymer a base material which has been molded into an appropriate shape and which forms a fibrous, granular and/or filmy carbon structure when burned in a non-oxidizing stmosphere since whereby the polymer is easily impregnated into or adheres to the molded material, and by burning the molded material at a temperature of about 700° C. of higher in a non-oxidizing atmosphere.

The silicon carbide-carbon composite molded product of this invention has a fibrous, granular and/or filmy carbon structure in the matrix consisting mainly of SiC and containing 40 to 65% by weight of Si, 25 to 45% by weight of C, 0.1 to 30% by weight of O, and 0.01 to 2% by weight of H.

The process for manufacturing a silicon carbide-carbon composite molded product according to this invention comprises the first step of applying an organic silicon polymer having a skeleton consisting mainly of carbon-silicon bonds by impregnation or adherence to a base material which has been molded into an appropriate shape and which forms a fibrous, granular and/or filmy carbon structure when burned in a vacuum or non-oxidizing atmosphere, and the second of burning the base material at a temperature ranging from 700° C. to 2,000° C. in a vacuum or non-oxidizing gas atmosphere.

BEST MODE OF CARRYING OUT THE INVENTION

A polysilmethylene polymer having a skeleton consisting mainly of

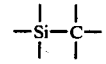

bonds, and generally called polycarbosilane can be used as the organic silicon polymer which is one of the starting materials for this invention. Examples of such a polymer may include polysilmethylenes having a structural unit of the formula (I):

polysilphenylenes having a structural unit of the formula (I):

poly(silpolymethylene)s having a structural unit (III):

polymers having a mixed structure of the structural nits (I) to (III), and carbosiloxane polymers composed of the structural units (I) to (III) and further a structural unit of the formula (IV):

These polymers do not always need to have a chain structure, but may have a cyclic or branched structure, or a chain structure containing a cyclic or branched structure. In the structural units (I) to (IV), R represents an organic atomic group, preferably an alkyl group such as methyl or an aryl group such as phenyl, and in certain cases may be a functional atom or group such as hydrogen or an alkoxyl group. The organic silicon polymer may preferably have a number-average molecular weight in the range of from about 100 to about 1,000,000, and more preferably about 500 to about 20,000.

These organic silicon polymers may be synthesized by, for example, the thermal decomposition and condensation of a monosilane(s) or a polysilane(s). By these methods, not only a polymer composed solely of a chain structure, but also a polymer composed oalely or partly of a cyclic and/or branched structure may be synthesized, and moreover, sometimes a polymer having a siloxane bond, a polysilane bond and/or another bond containing a different element may be also synthesized. The method which comprises the thermal decomposition and condensation of a monosilane is disclosed in, for example, Fritz, Angew. Chem., Vol. 79, page 657 (1967). The method which comprises the thermal decomposition and condensation of a polysilane is described in, for example, Japanese patent Applications Nos. 50-50223, 50-149468, 51-21365, 52-127630 and 55-89988.

The organic silicon polymer synthesized as hereinabove described is converted into an inorganic substance consisting mainly of SiC at a high yield by being burned in a non-oxidizing atmosphere.

The base material for the molded product, which is the other starting material for this invention, may be an organic high polymer of either a natural or synthetic high polymer. Examples of such a polymer may include, for example, cellulose series, protein series, isoprene series, pitch series, lignin poval series, polyvinyl alcohol series, polyvinyl chloride series, polyvinylidene chloride series, polyacrylonitrile series, furfuryl alcohol series, polyester series, polyolefin series, polystryrene series, phenol series, polyamide series, polyimide series, polyamideimide series, polybenzimidazole series, polyurethane series, polyphenylene oxide series, polysulfone series and polyfluoroethylene series polymers. Preferred organic high polymers among them may include, for example, cellulose series, polyacrylonitrile siries, polyvinyl alcohol series, lignin poval series, pitch series and furfuryl alcohol series polymers. Further, more preferable organic high polymers may be heat-resistant high polymers including, for example, polyamide serie, polyimide series, polyamideimide series, phenol series, polybenzimidazole series, polyphenylene sulfide series, polyphenylene oxide series and polysulfone series polymers.

The organic high polymer is molded into fibrous or film form, or foamed to form the base material for the molded product. The molding of the base material having a desired shape can be easily achieved by any conventional method employed in the industrial manufacture of paper, synthetic paper, cloth, foamed products, or the like. When the base material is burned in a vacuum or non-oxidizing atmosphere, it forms a fibrous, granular and/or filmy carbon structure.

According to the first step of the process of this invention, the organic silicon polymer having a skeleton consisting mainly of carbon and silicon is applied by impregnation or adherence to the base material for the molded product formed hereinabove described. The first step may, for example, be carried out by: dipping the base material in a solution of the organic silicon polymer to impregnate the base material with the solution; by melting the organic silicon polymer and applying it to the base material by impregnationn or adherence under, if necessary, as elevated or reduced pressure; or by applying powder of the organic silicon polymer to the base material which has been wetted at need.

As the solution in which the organic silicon polymer to be dissolved, an ordinary organic solvent in which the polymer is soluble is employed. Useful solvents may include, for example, aromatic hydrocarbons such as benzene, toluene and xylene, aliphatic hydrocarbons such as pentane, hexane and octane, alicyclic hydrocarbons such as cyclohexane, chlorinated hydrocarbons such as chloroform and carbon tetrachloride, and ethers such as tetrahydrofuran, and mixtures of these organic solvents with ketones such as acetone, and with alcohols such as methanol and ethanol.

The impregnation or adherence of the organic silicon polymer to the base material for the molded product can also be accomplished efficiently during the first step by dipping the base material in the solution of the polymer or the molten polymer under an elevated or reduced pressure.

The first step of the process of this invention enables to perform the impregnation or adherence of the polymer to the base material formed from any material of the type hereinbefore set forth without requiring any special treatment since the above-described orgnaic polymer is employed. Moreover, the impregnation or adherence of the polymer is applicable to the base material having any desired shape; therefore, the process of this invention is by far superior to the conventional method which employs an inorganic powder.

It may be, however, possible that the base material obtained by the first step of the process according to this invention does not have a desired content of the organic silicon polymer owing to volatilization or eluation of part of the polymer during the step of burning as hereinafter described. In this case, various methods are available for obtaining the desired content. The upper limit of the quantity of impregnation is the maximum quantity of the polymer impregnated into the base material, and that naturally depends largely on the material of which the base material is composed, while its lower limit is the minimum quantity required to form a silicon carbide-carbon composite molded product having a desired shape. The upper limit of the quantity of adherence can, however, exceed the maximum quantity of impregnation, and be increased or decreased according to the intended use for the composite molded product. The lower limit of the quantity of adherence is the minimum quantity required to form a composite molded product having a desired shape similarly as in the case of impregnation.

In the event a desired quantity of impregnation or adherence is not achieved, it may be necessary to add between the first and second steps of the process an additional step in order to insolubilize the organic silicon polymer which is impregnated into or adhering to the base material and to increase the residual amount of the polymer on buring. This additional step may typically be carried out by leaving or heating the base material containing the organic silicon polymer at a low temperature in the range of from room temperature to about 300° C. for at least several minutes in an oxdizing atmosphere containing at least one gas selected from the group consisting of air, ozone, oxygen and a halogen gas. If such insolubilization by oxidation is undesirable, the insolubilization of the polymer may be carried out by, for example, exposing it to ultraviolet rays, gamma rays or an electron beam at room temperature in a vacuum or in a nonoxidizing gas atmoshpere, such as of an inert gas. These methods make it possible to form a crosslinked structure between the organic silicon polymers and/or the polymer and the base material. This crosslinked structure prevents the polymer from volatilizing or melting during the burning step, thereby increasing the residual amount of the polymer on the burning step. The step of insolubilization is also effictive for preventing the base material from deforming caused by the melting or softening of the material on the burning step.

It may be also possible that the base material has such a high porosity and/or the pore is so large in size that the orgnaic silicon polymer may fail to attain a desired degree of impregnation or adherence to the base. In any such event, the first step may be repeated, if necessary, between the additional step of insolubilization and the second step until a desired quantity of impregnation or adherence is obtained.

According to the second step of the process of this invention, the base material to which the organic silicon polymer has been applied by impregnation or adherence during the first step is burned within a predetermined temperature range to form a silicon carbide-carbon composite molded product.

This burning step is carried out in a vacuum or in a non-oxidizing gas atmosphere of, for example, an inert gas. During the burning step, a low molecular component and an easily volatile component formed by thermal decomposition reaction are released from the organic silicon polymer and the base material. The volatilization of these volatile components begins gradually at a temperature higher than room temperature, and takes place most actively at a temperature of 400° C. to 750° C. If the base material is burned at a constant temperature, the molded product shrinks at a certain rate which depends on the kinds of the organic silicon polymer and the base material used, and also depends on whether the insolubilization treatment is taken or not. Therefore, when determining the dimensions of the molded product after burning, the degree of shrinkage is calculated with taking these conditions into consideration. The burning step can be also performed by a method which comprises a plurality of stages differing from one another in heating conditions, such as atmosphere, temperature and time. It is presumed that during the firing step the inorganic conversion takes place most actively at a temperature of about 600° C. to 700° C. and substantially ends at about 800° C. Therefore, the second step need be carried out at a burning temperature of 700° C. or higher, but the upper limit of the burning tenperature is to be set about 2,000° C. since the crystal growth of SiC brings about a reduction in stength to a remarkable extent where the burning temperature is too high. The burning temperature is preferably in the range of from about 800° C. to 1,800° C., and a more preferably in the range of from about 1,000° C. to 1,500° C.

The composite molded product thus obtained contains not only SiC, but also other constituents, i.e., free carbon and silicon oxides which are produced by the termal decomposition of the organic silicon polymer. The content of these constituents may have to be controlled in certain cases depending on the use for the molded product. This may be accomplished by an additional step for controlling the contents of carbon and oxygen in the burned product. This additional step may be performed after the second step and comprise the treatment of the product with fluoric acid and/or the heating thereof at a temperature of about 500° C. to 1,000° C. in an oxidizing atmosphere of, for example, air, oxygen or ozone, or in an atmosphere of, for example, hydrogen or ammonia gas. The fluoric acid treatment is superior than any other method, since fluoric acid is chemicaaly inactive on SiC of which the matrix of the molded product to be treated is mainly composed so that it allows $SiO_2$ to elute solely without exerting any influence on SiC. It is possible to control the elution by varying the concentration of the fluoric acid to be used and/or the dipping time. Free carbon can be removed from the matrix by heating the molded product in an atmosphere containing at least one gas selected from the group consisting of an oxidizing gas such as air, oxygen or ozone, hydrogen gas and ammonia gas. The amount of the carbon to be removed can be controlled by varying gas concentration, the heating temperature and/or the heating time. The heating temperature below 500° C., too low to remove the free carbon, while the temperature exceeding 1,000° C. should also be avoided since a reaction is likely to occur between SiC and the atmosphere gas.

The silicon carbide-carbon composite molded product manufactured as hereinabove described has a composite structure which contains a fibrous, granular and/or filmy carbon structure in the matrix consisting mainly of SiC. This composite structure can be identified by a scanning electron microscope. The X-ray diffraction patern of the fibrous, granular and/or filmy carbon indicates that the carbon does not have a graphite structure but an amorphous structure. The fibrous, granular and/or filmy carbon structure may, for example, comprise a three-dimensional network structure of intertwined fibers, a fabric structure, a cell structure, a skin structure or a dispersed granualr structure, depending on the structure of the base material which is one of the starting material.

The matrix consisting mainly of SiC is composed mainly of non-crystalline SiC and/or fine $\beta$-SiC crystal, amorphous carbon and a silicon oxide. By way of example, when a base material of cellulose film was impregnated with a polycarbosilane having a number-average molecular weight of about 1,500 and a skeleton consisting of

bonds, and was burned at various temperatures in a nitrogen gas atmoshpere, the X-ray diffraction of the products thus obtained revealed that β-SiC had apparent crystallite sizes of about 10, 20, 26, 28, 30, 50, 75 and 110 Å at burning temperatures of 900°, 1,000°, 1,100°, 1,200°, 1,300°, 1,400°, 1,500° and 1,600° C., respectively. It was also shown that a completely non-crystalline diffraction pattern was obtained at a burning temperature of 800° C., and that a remarkable growth of crystal took place at a burning temperature of 1,500° C. or higher. The amorphous carbon in the matrix is the product of thermal decomposition of the organic silicon polymer, and it is difficult to determine the amount of the amorphous carbon forming the matrix accurately. A weight ratio of C to SiC is presumed to be in the range of from 0.2 to 1.0 from a weight reduction shown when the product obtained by the thermal decomposition of an organic silicon polymer at a temperature of 700° C. or higher is oxidized by heating in the air at a temperature of 500° C. to 1,000° C. This ratio is actually somewhat higher, since the oxygen in the organic silicon polymer or the oxygen introduced by oxidation during the step of insolubilization forms an oxide of silicon during the burning step. Where the burning temperature exceeds 1,300° C., however, the weight ratios of C and O to SiC decrease gradually owing to a reaction between oxygen and carbon in the matrix, which is expressed as, for example, $SiO+2C\rightarrow SiC+CO$. The oxygens present in the matrix are, for example, cross-linking fine SiC particles, and while the structure is worked out clearly, the X-ray diffraction indicates part of the oxygen is forming a quartz phase or a cristobalite phase.

According to this invention, the silicon carbide-carbon composite molded product can be formed into a fine and complicated shape that has hitherto not been realized. This advantage is presumed to be due to the composite structure containing a fibrous, granular and/or filmy structure of amorphous carbon in the matrix consisting mainly of SiC. Even if only the organic silicon polymer is formed into a film and fired, it is hardly possible to obtain molded product large in size without any deformation or cracking. It is also presumed that the compatibility between the organic silicon polymer and the complicatedly shaped base material is so good that the polymer is impregnated into or adheres to the base material easily, their shrinkages occur almost simultaneously during the burning step without being separated from each other, a stress is distributed throughout the base material, thereby preventing the product from deforming.

The chemical analysis of the silicon carbide-carbon composite molded product of this invention has shown that the matrix generally contains 40 to 65% by weight of Si, 25 to 45% by weight of C, 0.1 to 30% by weight of O and 0.01 to 2% by weight of H. The matrix is superior in resistant to oxidation and heat because of consisting mainly of SiC. The base material for the molded product lends itself to various forming techniques, such as corrugation, honeycomb forming, tube forming, embossing and sheet forming, that have been difficult to apply to any conventional sintered ceramic product. The molded product of this invention is, therefore, easy to be formed into any desired shape, so that it can be applied to, for example, electronic devices which require a complicated shape to the product. Thus the product of this invention can be expected to realize a wide variety of applications including a heat resistant material.

The following examples illustrate this invention.

EXAMPLE 1

A stainless steel vessel equipped with a reflux condenser was charged with a mixture of 2,000 grams of polydimethylsilane

having a polymerization degree of about 35 and 103 grams of a borosiloxane compound having a bond of the formula $-Si(C_6H_5)_2-O-B<$, which was synthesized by dehydrochlorination reaction of 3 moles of diphenyldichlorosilane with 2 moles of boric acid. The mixture was subjected to thermal decomposition and condensation under a normal atmospheric pressure at about 350° C. for 10.5 hours in a nytrogen stream. A xylene solution of the reaction product was subjected to filtration to remove undissolved matter. The reaction product was then distilled in a nitrogen atmosphere to remove the solvent (xylene) and low-boiling constituents having a boiling point not exceeding 300° C. and to concentrate, resulting in giving a light brown resinous polycarbosilane partly containing siloxane bonds and having a number-average molecular weight of 1,310.

An impregnating solution was prepared by dissolving 100 grams of the polycarbosilane in 300 cc of xylene. As a base material for a molded product, cotton cellulose paper made by the known papermaking technique and having a weight of 120 grams per $m^2$ and a thickness of 0.26 mm was used. This was dipped in the impregnating solution for an hour, left in the air for 24 hours to dry, and then cut into 7.0 mm×70.0 mm. A base material impregnated with polycarboxilane was burned by heating to 1,200° C. at a heating rate of 100° C. per hour and holding at 1,200° C. for an hour in a nitrogen stream of a flow rate of 100 cc/min to give Sample 1. Another base material impregnated with polycarbosilane was heated to 110° C. at a heating rate of 15° C. per hour and held at 100° C. for 30 minutes for insolubilization to give Sample 2. Still another base material was repeated the impregnation and insolubilization under the same conditions after the first insolubilization to give Sample 3. The steps of impregnation and insolubilization were further repeated for Sample 4. Samples 2 to 4 and, for comparison, the cotton cellulose paper as Sample 5 were burned under the same condition as of Sample 1.

TABLE 1

| Sample | Weight before burning (mg) | Weight after burning (mg) | Degree of Shrinkage (%) |
|---|---|---|---|
| 1 | 110.2 | 46.3 | 28.6 |
| 2 | 123.1 | 57.9 | 27.1 |
| 3 | 136.5 | 69.4 | 28.1 |
| 4 | 148.4 | 78.4 | 29.3 |
| 5 | 60.3 | 4.2 | 32.3 |

In TABLE 1, Samples 1 to 4 of Example 1 showed good reproducibility in respect of the weights before and after burning, and the degree of shrinkage. Sample 1 and a matrix containing 54.5% by weight of Si, 36.6% by weight of C, 4.53% by weight of O and 0.10% by weight of H, while Samples 2 to 4 had a matrix containing 44.3 to 48.9% by weight of Si, 28.4 to 31.4% by weight of C, 13.5 to 19.6% by weight of O and 0.01 to 0.40% by weight of H. The $\beta$-SiC in the matrix of Sample 1 had an apparent crystalline size of about 18 Å, while that in each of Samples 2 to 4 was 10 Å or less. Thus, it is presumed that Samples 1 to 4 were both a silicon carbide-carbon composite ceramic sheet having a non-crystalline structure.

EXAMPLE 2

An impregnating solution was prepared by dissolving 50 grams of polycarbosilane as used in EXAMPLE 1 in 300 cc of xylene. As a base material for a molded product, diethylamino cellulose (DEAE) paper made by the known papermaking technique and having a weight of 100 grams per m$^2$ and a thickness of 0.22 mm was used. This was dipped in the impregnating solution for 0.5 hour, and then it left in the air for 24 hours. After dried, it was cut into 7.0 mm×70.0 mm to give Sample 6. The steps of impregnation and drying of Sample 6 were repeated twice for Sample 7. These Samples 6 and 7, and Sample 8 which is only the DEAE paper for comparison, were burned by heating to 1,200° C. at a heating rate of 100° C. per hour and holding at 1,200° C. for an hour in a nitrogen stream of a flow rate of 100 cc/min. The results are shown in TABLE 2.

TABLE 2

| Sample | Weight before burning (mg) | Weight after burning (mg) | Degree of Shrinkage (%) |
|---|---|---|---|
| 6 | 78.0 | 25.6 | 30.0 |
| 7 | 83.3 | 29.3 | 30.0 |
| 8 | 52.1 | 5.5 | 31.6 |

The results obtained with Samples 6 and 7 showed good reproducibility. They were both a silicon carbide-carbon composite ceramic sheet having excellent properties.

EXAMPLE 3

A impregnating solution was prepared by dissolving 50 grams of polycarbosilane as used in EXAMPLE 1 in 300 cc of toluene. A base material of hollow cylinder formed from cotton cellulose, and having an outside diameter of x (mm), an inside diameter of y (mm), a length of l (mm) and a weight of 2.137 grams was dipped in the impregnating solution for an hour, and dried in the air at room temperature for 48 hours. Then, it was burned by heating to 1,200° C. at a heating rate of 100° C. per hour and holding at 1,200° C. for an hour in an argon stream of a flow rate of 100 cc/min,. The weights and dimensions of the molded product which were measured before and after burning are shown in TABLE 3. The dimensions x, y and l showed degrees of shrinkage of 31.5%, 31.2%, 31.3%, respectively. Thus, a silicon carbide-carbon composite ceramic pipe which had shrunk substantially equally in all directions was obtained.

TABLE 3

| | Weight (g) | x (mm) | y (mm) | l (mm) |
|---|---|---|---|---|
| Before burning | 3.461 | 20.0 | 17.0 | 80.0 |
| After burning | 1.258 | 13.7 | 11.7 | 55.0 |

EXAMPLE 4

A hollow semispherical body formed from cotton cellulose, and having an outside diameter of x (mm), an inside diameter of y (mm), a height of d (mm) and a weight of 262 mg was impregnated with polycarbosilane, and burned in the same manner as in EXAMPLE 3. The weights and dimensions of the product as measured before and after burning are shown in TABLE 4.

TABLE 4

| | Weight (mg) | x (mm) | y (mm) | d (mm) |
|---|---|---|---|---|
| Before burning | 403 | 20.0 | 17.0 | 10.0 |
| After burning | 146 | 13.7 | 11.7 | 6.8 |

EXAMPLE 5

Two samples were prepared similarly as Sample 1 of EXAMPLE 1. One of them was exposed to radiation of gamma rays at 10$^8$R, and the other to ultraviolet rays at 254 nm for an hour, both in a vacuum. They were burned by heating to 1,200° C. at a heating rate of 100° C./h and holding thereat for an hour in a nitrogen stream of a flow rate of 100 cc/min. They weighed 56.4 mg and 53.5 mg, respectively after burning. The infrared absorption spectra of the two samples indicated substantially the same content of oxygen in the matrix as Sample 1 of EXAMPLE 1 after burned. Thus, it was found that the radiation in a vacuum contributed to increase the residual amount of the product after burning without causing any appreciable increase in the content of oxygen in the matrix.

EXAMPLE 6

250 grams of the polydimethylsilane as used in EXAMPLE 1 were subjected to thermal decomposition and condensation at 470° C. for 14 hours in a one-liter autoclave. The impurities were removed by filtration from a n-hexane solution of the reaction product. Low-boilng substances having a boiling point not exceeding 150° C. under 1 mmHg were removed by vacuum distillation. There was obtained a polycarbosilane having a number-average molecular weight of 800 and a skeleton composed of Si—C bonds.

The polycarbosilane was heated to 100° C. under a reduced pressure of 1 mm Hg. Cotton cellulose paper as used in EXAMPLE 1 was dipped in the liquid polycarbosilane thus obtained for five minutes, and after cooled it was cut into 7.0 mm×70.0 mm. The impregnated paper was burned by heating to 190° C. at a heating rate of 30° C. per hour and holding thereat for 0.5 hour in the air, and by further heating to 1,400° C. at a heating rate of 100° C. per hour and holding thereat for an hour in a vacuum to give Sample 9. The results are shown in TABLE 5. TABLE 5 also shows the results obtained on samples prepared by adding to the thus obtained product five hours of heat treatment at 600° C. in the air (Sample 10), and by dipping the product in fluoric acid for 24 hours (Sample 11).

TABLE 5

| Sample | Weight before burning (treatment) (mg) | Weight after burning (treatment) (mg) | Degree of Shrinkage (%) |
|---|---|---|---|
| 9 | 150.2 | 68.8 | 28.5 |
| 10 | 68.1 | 60.1 | 0 |

TABLE 5-continued

| Sample | Weight before burning (treatment) (mg) | Weight after burning (treatment) (mg) | Degree of Shrinkage (%) |
| --- | --- | --- | --- |
| 11 | 69.0 | 61.4 | 0 |

The decrease in weight shown in the table above and the X-ray diffraction and infrared absorption spectra showed the removal from the matrix of carbon by the air treatment, and of $SiO_2$ by the fluoric acid treatment. There was shown no deformation of the product by such air or fluoric acid treatment. The molded product of Sample 9 was a silicon carbide-carbon composite ceramic sheet in which the matrix contains 51.3% by weight of Si, 34.1% by weight of C, 9.55% by weight of O and 0.05% by weight of H and $\beta$-SiC in the matrix has an apparent crystallite size of 73 Å.

EXAMPLE 7

A mixture of 100 grams of the polydimethylsilane as used in EXAMPLE 1 with 1.50 g of $AlCl_3$ was reacted at 355° C. for 16.5 hours in a nitrogen stream in a one-liter quartz tube equipped with a reflux tube. The impurities were removed by filtration from a xylene solution of the reaction product. The xylene and low-boiling substances were removed by distillation at a maximum temperature of 320° C. in an nitrogen atmosphere. There were obtained 59.5 grams of polycarbosilane partly containing a polysilane skeleton and having a number-average molecular weight of 1,600.

An impregnating solution was prepared by dissolving 25 grams of the polycarbosilane in 100 cc of benzene. A fabric woven of a fibrous novolak resin and having a weight of 300 grams per $m^2$ and a thickness of 1.00 mm was dipped in the impregnating solution for an hour. The fabric was dried at room temperature for 24 hours to give Sample 12. Sample 12 was further impregnated with the impregnating solution, and dried to prepare Sample 13. Sample 12 was heated at a heating rate of 15° C. per hour and held at 110° C. for 0.5 hour in the air for the insolubilization of the polycarbosilane to give Sampel 14. Sample 14 was further impregnated with the impregnating solution, dried and treated for the insolubilization of the polycarbosilane to give Sample 15. For comparison, the fabric not impregnated with the impregnating solution was used as Sample 16. All samples were cut into 20.0 mm×20.0 mm, and burned by heating to 1,200° C. at a heating rate of 200° C. per hour and holding thereat for an hour in a nitrogen stream of a flow rate of 100 cc/min. The results are shown in TABLE 6.

TABLE 6

| Sample | Weight before burning (mg) | Weight after burning (mg) | Degree of Shrinkage (%) |
| --- | --- | --- | --- |
| 12 | 196.2 | 121.1 | 20.5 |
| 13 | 266.7 | 167.6 | 23.0 |
| 14 | 183.5 | 124.1 | 21.8 |
| 15 | 279.4 | 194.5 | 22.3 |
| 16 | 124.7 | 69.2 | 18.8 |

These results showed good reproducibility, and silicon carbide-carbon composite ceramic sheets could be manufactured without any deformation.

EXAMPLE 8

A 20.0 mm square polyethylene sheet having a weight of 60 grams per $m^2$ and a thickness of 0.15 mm, and having a cellular structure formed by the known technique was dipped in the impregnating solution as used in EXAMPLE 7 for 0.5 hour, and dried at room temperature for 24 hours to give Sample 17. Sample 17 was heated to 110° C. at a heating rate of 15° C. per hour and held thereat for 0.5 hour in the air for the insolubilization of the polycarbosilane to give Sample 18. For comparison, the sheet not impregnated with the impregnating solution was used as Sample 18. All the samples were burned by heating to 1,200° C. at a heating rate of 100° C. per hour and holding thereat for an hour in a nitrogen stream of a flow rate of 100 cc/min. Sample 17 cracked so finely that it hardly retained its original shape. Sample 18 shrank by 5.0% along the long axis of the cells defining the cellular stracutre and by 15.0% along their short axis as a result of the insolubilization treatment, and finaly by 23.5% along their long axis and by 32.0% along thier short axis upon burning. In this case, silicon carbide-carbon ceramic sheet having good reproducibility could be also manfactured. Sample 19 had a residual amount of zero on after burned.

EXAMPLE 9

The vapor of 100 grams of tetramethylsilane, $Si(CH_3)_4$, was circualted through a quartz tube heated at 770° C. in an electric furnace for 24 hours to be subjected to thermal decomposition and condensation. The reaction product was dissolved in hexane, and undissolved matter was removed from the solution by filtration. The low molecular substances having a boiling point not exceeding 200° C. under 1 mm Hg were also removed. There were obtained 6.8 grams of polycarbosilane having a skeleton consisting of Si—C bonds and a number-average molecular weight of 770.

An impregnating solution was prepared by dissolving 5.0 grams of the polycarbosilane in 30 cc of hexane. Felt made from polyparaphenyleneterephthalamide fiber and having a weight of 190 grams per $m^2$ and a thickness of 0.25 mm was dipped in the impregnating solution for an hour. After dried for 24 hours, the felt was cut into 20.0 mm×20.0 mm. Then, it was heated to 200° C. at a heating rate of 10° C. per hour and held thereat for an hour in the air for the insolubilization of the polycarbonsilane, and burned by heating to 1,000° C. at a heating rate of 100° C. per hour and holding thereat for an hour in an argon stream of a flow rate of 150 cc/min. The results are shown in TABLE 7.

TABLE 7

| Weight before burning (mg) | Weight after burning (mg) | Degree of shrinkage (%) |
| --- | --- | --- |
| 88.0 | 50.6 | 19.0 |

There was obtained a silicon carbide-carbon composite ceramic sheet having a matrix containing 50.6% by weight of Si, 35.6% by weight of C, 12.5% by weight of O and 0.74% by weight of H, and containing in the matrix $\beta$-SiC having an apparent crystallite size of 8 Å.

EXAMPLE 10

100 grams of the polycarbosilane obtained in EXAMPLE 1 were dissolved in 100 cc of xylene, and 150 cc of acetone were added to the solution to precipitate a high molecular polycarbosilane. The pecipitation was separated by filtration, and dried in a vacuum to give 17 grams of polycarbosilane having a number-average molecular weight of about 15,000.

An impregnating solution was prepared by dissolving 10 grams of the polycarbosilane in 50 cc of toluene. A sheet of paper made similarly as in EXAMPLE 1 was dipped in the impregnating solution, and after left at room temperture for 24 hours to dry, the paper was cut into 7.0 mm×70.0 mm. Four samples thus prepared were fired by heating at a heating rate of 100° C. per hour to 800° C., 1,000° C., 1,200° C. and 1,400° C. and holding thereat, respectively, for an hour in a nitogen stream of a flow rate of 100 cc/min. The results are shown in TABLE 8.

TABLE 8

| Burning temperature (°C.) | Weight before burning (mg) | Weight after burning (mg) | Degree of Shrinkage (%) |
|---|---|---|---|
| 800 | 104.0 | 44.1 | 26.3 |
| 1,000 | 103.8 | 42.0 | 27.9 |
| 1,200 | 104.1 | 41.2 | 28.6 |
| 1,400 | 104.0 | 39.8 | 28.5 |

These results showed good reproducibility.

EXAMPLE 11

A sheet of paper prepared from polytetrafluoroethylene fiber in accordance with the known papermaking technique and having a weight of 700 grams per m$^2$ and a thickness of 1.0 mm was cut into 10.0 mm×40.0 mm and dipped in the impregnating solution prepared similary as in EXAMPLE 2 for an hour. After left in the air for 24 hours to dry, the paper was dipped in the impregnating solution again, and left at room temperature in the air for three hours to dry. It was, then, burned by heating to 1,000° C. at a heating rate of 100° C. per hour and holding thereat for an hour in a nigrogen stream of a flow rate of 100 cc/min. The results are shown in TABLE 9. TABLE 9 also shows the results obtained by using the paper which was equally sized but not impregnated with the impregnating solution. These results showed good reproducibility.

TABLE 9

| | Weight before burning (mg) | Weight after burning (mg) | Degree of Shrinkage (%) |
|---|---|---|---|
| Sample impregnated | 273.5 | 13.7 | 22.5 |
| Sample not impregnated | 224.3 | 0 | — |

EXAMPLE 12

50 grams of p-chlorophenyl-dimethylchloro-silane

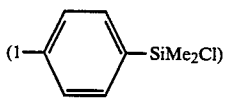

was subjected to dechlorination and condensation by metallic sodium in boiling toluene in a nitrogen atmosphere to give 28 grams of polydimethylsilphenylene

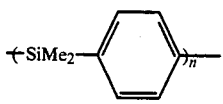

having a number-average molecular weight of 2,300. An impregnating solution was prepared by dissolving 10 grams of the polydimethylsilphenylene in 50 cc of benzene. A sheet of paper prepared similary as in EXAMPLE 1 was dipped in the impregnating solution, and after left at room temperature for 24 hours to dry, the paper was cut into 7.0 mm×70.0 mm. Then, it was burned by heating to 1,200° C. at a heating rate of 100° C. per hour and holding thereat for an hour in an argon gas stream of a flow rate of 100 cc/min. The results are shown in TABLE 10.

TABLE 10

| Weight before burning (mg) | Weight after burning (mg) | Degree of Shrinkage (%) |
|---|---|---|
| 103.9 | 38.5 | 29.5 |

The molded product thus obtained was a silicon carbide-carbon composite ceramic sheet having a matrix containing 48.5% by weight of Si, 42.8% by weight of C, 1.2% by weight of O and 0.20% by weight of H, and containing in the matrix β-SiC having an apparent crystallite size of about 9 Å.

We claim:

1. A process for manufacturing a silicon carbide-carbon composite molded product, comprising the first step of securing an organic silicon polymer having a skeleton consisting mainly of carbon-silicon bonds to an organic polymer base material having a desired shape and capable of forming a fibrous, granular or filmy carbon structure when it is burned in a non-oxidizing atmosphere, and the second step of burning said base material at a temperature ranging from 700° C. to 2,000° C. in a vacuum or in a non-oxidizing gas atmosphere to thereby thermally decompose said organic silicon polymer and create an inorganic matrix consisting mainly of SiC in which said fibrous, granular or filmy carbon structure exists in amorphous form.

2. A process according to claim 1, wherein said base material is burned at a temperature ranging from 800° C. to 1,800° C.

3. A process according to claim 1, wherein said base material is burned at a temperature ranging from 1,000° C. to 1,500° C.

4. A process according to claim 1, wherein said first step is carried out by dipping said base material in a solution of said organic silicon polymer.

5. A process according to claim 1, wherein said first step is carried out by dipping said base material in a molten bath of said organic silicon polymer.

6. A process according to claim 1, further comprising between said first and second steps the step subjecting said base material at a low temperature to an oxidizing atmosphere, thereby insolubilizing said organic silicon polymer.

7. A process according to claim 1, further comprising between said first and second steps the step of radiating ultraviolet rays, gamma rays or an electron beam on said base material in a non-oxidizing atmosphere, thereby insolubilizing said organic silicon polymer.

8. A process according to claim 6 or 7, wherein said first step is repeated after said insolubilization.

9. A process according to claim 1, wherein said organic silicon polymer is a polysilmethylene, a polysilphenylene, a poly(silpolymethylene), carbosiloxane polymer or a mixture thereof.

10. A process according to claim 9, wherein said organic silicon polymer has a number-average molecular weight ranging from 100 to 1,000,000.

11. A process according to claim 10, wherein said organic silicon polymer has a number-average molecular weight ranging from 500 to 20,000.

12. A process according to claim 1, wherein said base material is composed of an organic high polymer selected from the group consisting of a cellulose polymer, a protein polymer, an isoprene polymer, a pitch polymer, a lignin poval polymer, a polyvinyl alcohol polymer, a polyvinyl chloride polymer, a polyvinylidene chloride polymer, a polyacrylonitrile polymer, a furfuryl alcohol polymer, a polyester polymer, a polyolefin polymer, a polystyrene polymer, a phenol polymer, a polyamide polymer, a polyimide polymer, a polyamideimide polymer, a polybenzimidazole polymer, a polyurethane polymer, a polyphenylene sulfide polymer, a polyphenylene oxide polymer, a polysulfone polymer and a polyfluoroethylene polymer.

13. A process according to claim 1, wherein said base material is composed fo a heat-resistant organic high polymer selected from the group consisting of a polyamide polymer, a polyimide polymer, a polyamideimide polymer, a phenol polymer, a polybenzimidazole polymer, a polyphenylene sulfide polymer, a polyphenylene oxide polymer or a polysulfone polymer.

14. A process for the manufacture of an integrated silicon carbide-carbon product which comprises:

forming a moldable high polymer capable of being reduced to a carbonaceous skeleton when burned in a non-oxidizing atmosphere into a predetermined shape, applying to said polymer a polysiloxane polymer having at least one of the following repeating groups:

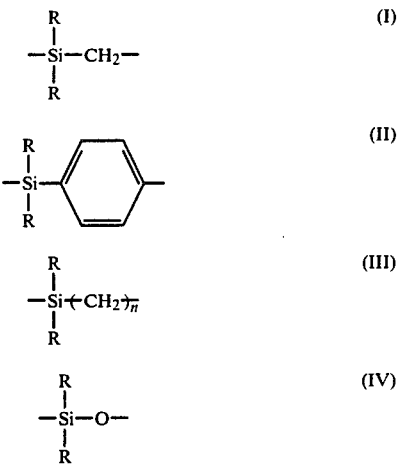

where R is an alkyl group, an aryl group, hydrogen, or an alkoxy group, and n is an integer, said polysiloxane polymer being in liquid form and having an average molecular weight in the range from about 100 to 1,000,000, said polysiloxane polymer adhering to said high polymer, and burning the resulting shaped product at a temperature of from 700° C. to 2000° C. under non-oxidizing conditions to form a composite inorganic silicon carbide-carbon composite including a matrix containing β-SiC and substantially amorphous carbon, said composite containing 40 to 65% by weight Si, from 25 to 45% by weight C, from 0.1 to 30% by weight O, and 0.01 to 2% by weight H.

15. The method of claim 14 wherein the shrinkage of said high polymer and said polysiloxane polymer are sufficiently close so as not to deform the shape during burning.

16. The method of claim 14 wherein said average molecular weight is in the range from about 500 to about 20,000.

* * * * *